US012460404B1

(12) United States Patent
Warren

(10) Patent No.: US 12,460,404 B1
(45) Date of Patent: Nov. 4, 2025

(54) MATERIAL REGULATING TRAP FOR SEWER CONNECTION

(71) Applicant: Danny Warren Consulting, LLC, Carver, MA (US)

(72) Inventor: Danny Warren, Carver, MA (US)

(*) Notice: Subject to any disclaimer, the term of this patent is extended or adjusted under 35 U.S.C. 154(b) by 0 days.

(21) Appl. No.: 18/795,241

(22) Filed: Aug. 6, 2024

(51) Int. Cl.
*E03F 5/14* (2006.01)

(52) U.S. Cl.
CPC ........................... *E03F 5/14* (2013.01)

(58) Field of Classification Search
CPC ............................................ E03F 5/14
USPC ............................................... 210/739
See application file for complete search history.

(56) References Cited

U.S. PATENT DOCUMENTS

| | | | | |
|---|---|---|---|---|
| 5,562,819 A * | 10/1996 | Turner, Jr. | ........... | B01D 29/96 210/170.03 |
| 7,638,065 B2 * | 12/2009 | Stever | ........... | C02F 1/004 210/170.03 |
| 10,882,772 B1 * | 1/2021 | Wensel | ........... | E03F 5/101 |
| 2003/0034286 A1 * | 2/2003 | Butler | ........... | E03F 5/0404 210/163 |
| 2005/0029201 A1 * | 2/2005 | Rodis | ........... | B01D 17/0211 210/744 |

FOREIGN PATENT DOCUMENTS

| | | | | |
|---|---|---|---|---|
| CN | 104563273 A | * | 4/2015 | ........ E03F 5/14 |
| JP | H0468137 A | * | 3/1992 | ........ E03F 1/00 |
| JP | 2016037721 A | * | 3/2016 | ........ E03F 5/14 |

OTHER PUBLICATIONS

Translation of Kojima (JPH0468137A) (Year: 1992).*
Translation of Hara (JP 2016037721) (Year: 2016).*

* cited by examiner

Primary Examiner — Ekandra S. Miller-Cruz

(57) ABSTRACT

A method and system that operates to capture improper disposal materials prior to their entry to the municipal sewer system in order to the burdens of such improper disposals on the originator of the waste. A trap assembly captures improper disposal materials at their source so as to provide notice to the generator of such waste that such activity is prohibited and to provide a mechanism by which responsibility for such improper waste disposal can be correctly identified and assigned.

12 Claims, 4 Drawing Sheets

MATERIAL REGULATING TRAP FOR SEWER CONNECTION

BACKGROUND OF THE INVENTION

The present disclosure relates to a method and system for the regulation of material flowing into a sewer disposal pipe. More specifically, the present disclosure relates to a method and system of regulating and capturing prohibited material from flowing into a sewer disposal pipe in a manner that captures the material for later inspection and possibly regulatory action.

For many years, problems have arisen with the growing market of disposable items, such as diapers, wet wipes, incontinence garments and feminine care products that are discarded by consumers by flushing them via toilet fixtures. Ideally, when a flushable disposable product is discarded in either sewer or septic systems, the product, or designated portions of the product, should "disperse" and thus sufficiently dissolve or disintegrate in water so as not to present problems under conditions typically found in household and municipal sanitization systems. However, many of these products fail to properly disperse. While many current wipe manufacturers achieve acceptable strength in flushable moist wipes by using long fibers (>10 mm) which entangle with other fibers to develop a wet strength network, these long fibers are not desirable because they also tend to collect on screens in waste water systems and cause obstructions and blockages.

While the intent of design of flushable moist wipes is that they easily pass through current municipal sewer systems, the reality is that in practical application they do not sufficiently break down. Some current non-dispersible wipes are mistakenly treated as toilet flushable by the consumer because they typically clear the toilet and drain pipe of an individual residence. In addition, users accustomed to flushing such sanitary products fail to discriminate between products that are acceptable for flushing and products that create downstream problems. Thus, a variety of products such as cloths, non-flushable wipes, diapers, lighters, ballpoint pens, wooden chopsticks, towels, mops, sanitary napkins, food waste, plastic bags, cleaning wipes, etc. are improperly disposed of via a toilet.

Should these materials exit the sewer connection, however, the either end up in an individual disposal system (ISDS) in the homeowners' tank or are simply transferred to the next stage in the wastewater treatment and transport system. In such a case non-flushable waste can build up, causing a blockage and placing significant stress on the entire wastewater transport and treatment system. These flows then enter sewage pump manholes or a relay pump station and may cause a failure of a sewage water pump or the like.

As a result, municipal wastewater treatment entities around the world have identified non-dispersible waste disposal as a problem, identifying the need to find options to prevent further stress on waste systems. Some of these options include sewage receptacles having a screen that is detachably attached to the sewage receptacle to filter large foreign matter from the sewer. However, when the foreign substance is caught on the screen, maintenance is required to remove the foreign substance from the screen and install it again, the entire burden of which is placed on the municipality.

As a result, there has been a movement by municipalities to define "flushable" through various regulations. Flushable moist wipes must meet these regulations to allow for compatibility with home plumbing fixtures and drain lines, as well as the disposal of the product in onsite and municipal wastewater treatment systems. By following these regulations, manufacturers can ensure that in normal conditions products best disposed of via the waste water systems for public health and hygiene reasons will not block toilets, drainage pipes, water conveyance and I treatments systems or become an aesthetic nuisance in surface waters or soil environments.

Despite such rules and regulations, consumers still deposit prohibited materials into the system and thereby continue to place a burden on the system and the municipality maintaining the system.

There is therefore a need for a method and system that operates to capture improper disposal materials prior to their entry to the municipal sewer system. There is a further need for a method and system that places the burdens of such improper disposals on the originator of the waste. There is still a further need for a method and system, that captures improper disposal materials at their source so as to provide notice to the generator of such waste that such activity is prohibited and to provide a mechanism by which responsibility for such improper waste disposal can be correctly identified and assigned.

SUMMARY OF THE DISCLOSURE

In accordance with the present disclosure, method and system for the regulation of material flowing into a sewer disposal pipe is provided. More specifically, the present disclosure provides to a method and system of regulating and capturing prohibited material from flowing into a sewer disposal pipe in a manner that captures the material for later inspection and possibly regulatory action.

In a general embodiment, a trap assembly is provided that is configured an arranged for installation at the outlet end of sewer pipe lateral at a location prior to its connection with the municipal sewer system. In some embodiments the trap assembly is configured for installation on the interior of a structure while in other embodiments the trap assembly may be installed in the ground on the exterior of the structure.

In a preferred embodiment, the trap assembly includes a sealed removable cover to allow access, inspection and the removal of trapped debris from the interior thereof. Preferably, access to the cover is regulated by an anti-tamper means such as an anti-tamper loop or a locking mechanism. If installed on the exterior of the structure, the trap assembly may be below grade. Further, the trap assembly may have a work box positioned around it to allow access without the need for digging. In either of the above cases, the regulated cover may be the work box cover, the trap assembly cover or both.

The trap assembly preferably includes a capture mechanism therein to capture and retain prohibited materials that disposed or flushed onto the sewer lateral before they exit the lateral and enter the municipal sewer disposal system. The capture mechanism may be an array of hooks, barbs, screens or combinations thereof.

In some embodiments the trap assembly may have an alarm thereon to indicate when sufficient debris has been captured therein to indicate an imminent or actual clogging of the lateral outlet. The alarm may be audible, visual or combinations thereof. The alarm may be a local alarm that signals to the occupants of the structure where the trap assembly is installed. The alarm may be a broadcast alarm that alerts the municipality managing the sewer disposal system. The alarm may alert both the occupants of the structure and the municipality.

In accordance with a method disclosed herein, a controlled access trap assembly as described above is installed on a sewer lateral prior to its discharge into the municipal sewer disposal system. Prohibited materials that are disposed of via the sewer lateral are captured before being discharged. Should sufficient prohibited materials be captured in the trap assembly an alarm sounds to indicate an imminent clog within the sewer lateral. In order to clear the collected debris, the occupants of the building must contact the municipality managing the sewer disposal system in order to gain access to the trap assembly and clear the accumulated debris.

It is therefore an object of the present disclosure to provide a method and system that operates to capture improper disposal materials prior to their entry to the municipal sewer system. It is a further object of the present disclosure to provide a method and system that places the burdens of such improper disposals on the originator of the waste. It is still a further object of the present disclosure to provide a method and system that captures improper disposal materials at their source so as to provide notice to the generator of such waste that such activity is prohibited and to provide a mechanism by which responsibility for such improper waste disposal can be correctly identified and assigned.

These together with other objects of the disclosure, along with various features of novelty which characterize method and system, are pointed out with particularity in the claims annexed hereto and forming a part of this disclosure. For a better understanding of the method and system, its operating advantages and the specific objects attained by its uses, reference should be had to the accompanying drawings and descriptive matter in which there is illustrated a preferred embodiment of the method and system.

BRIEF DESCRIPTION OF THE DRAWINGS

In the drawings which illustrate the best mode presently contemplated for carrying out the present invention.

DETAILED DESCRIPTION OF THE DISCLOSURE

Figure 1:
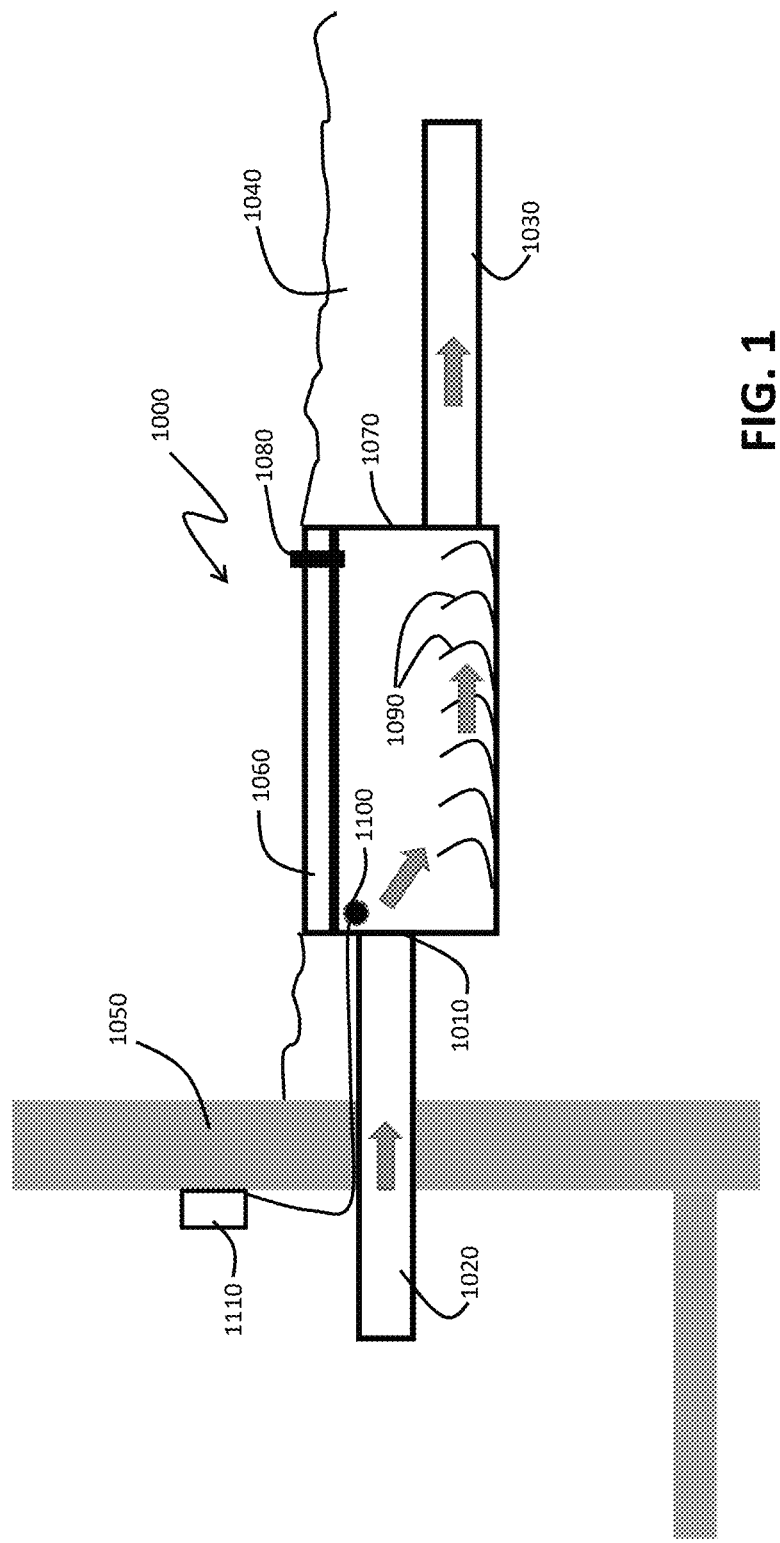
FIG. 1 is a cross sectional view of a trap assembly installed in accordance with an embodiment of the present disclosure.

Now referring to the drawings, embodiments of a method and system in accordance with the present disclosure are provided illustrating a method and system for the regulation of material flowing into a sewer disposal. In the most general embodiment a method and system of regulating and capturing prohibited material from flowing into a sewer disposal pipe operates in a manner that captures the material for later inspection and possible regulatory action.

Turning now to FIG. 1, in a general embodiment, a trap assembly 1000 in accordance with the present disclosure is provided. The trap assembly 1000 is configured an arranged for installation at the outlet end 1010 of sewer pipe lateral 1020 at a location prior to its connection with the municipal sewer system 1030. In this embodiment the trap assembly 1000 is configured for installation in the ground 1040 on the exterior of a structure 1050 while in other embodiments the trap assembly may be installed in the ground on the interior of the structure.

In a preferred embodiment, the trap assembly 1000 includes a sealed removable cover 1060 positioned on a trap assembly body 1070 that provides a watertight seal and allow access to an interior of the trap assembly body 1070 for the inspection and the removal of trapped debris from the interior of the trap assembly body 1070. Preferably, access to the cover 1060 is regulated and access thereto is restricted by an anti-tamper means 1080 such as an anti-tamper loop or a locking mechanism.

The trap assembly 1000 preferably includes a capture mechanism 1090 on the interior of the trap assembly body 1070 therein to capture and retain prohibited materials that are disposed or flushed into the sewer lateral 1020 before they exit the lateral and enter the municipal sewer disposal system 1030. The capture mechanism 1090 may be an array of hooks, barbs, screens or combinations thereof. Further, the trap assembly body 1070 may be a box or a section of tubing as would be apparent to anyone skilled in the art.

In some embodiments the trap assembly 1000 may have an alarm device thereon including a sensor 1100 which may or may not be interfaces with an alarm box 1110. The interface between the sensor 1100 and an alarm box 1110 (if used) may be wired or via wireless RF communication as is known in the art. Should the sensor 1100 detect a rise in the retained water level in the trap assembly body 1070 it provides an alarm indicating that sufficient debris has been captured within the trap assembly body 1070 to indicate an imminent or actual clogging of flow to the outlet into the municipal sewer system 1030. The alarm may be audible, visual or combinations thereof. The alarm thereon indicates when sufficient debris has been captured on the interior of the trap assembly results in an imminent or actual clogging of the lateral outlet. The alarm may be a local alarm that signals to the occupants of the structure where the trap assembly is installed. The alarm may be a broadcast alarm that alerts the municipality managing the sewer disposal system. The alarm may alert both the occupants of the structure and the municipality.

Figure 2:
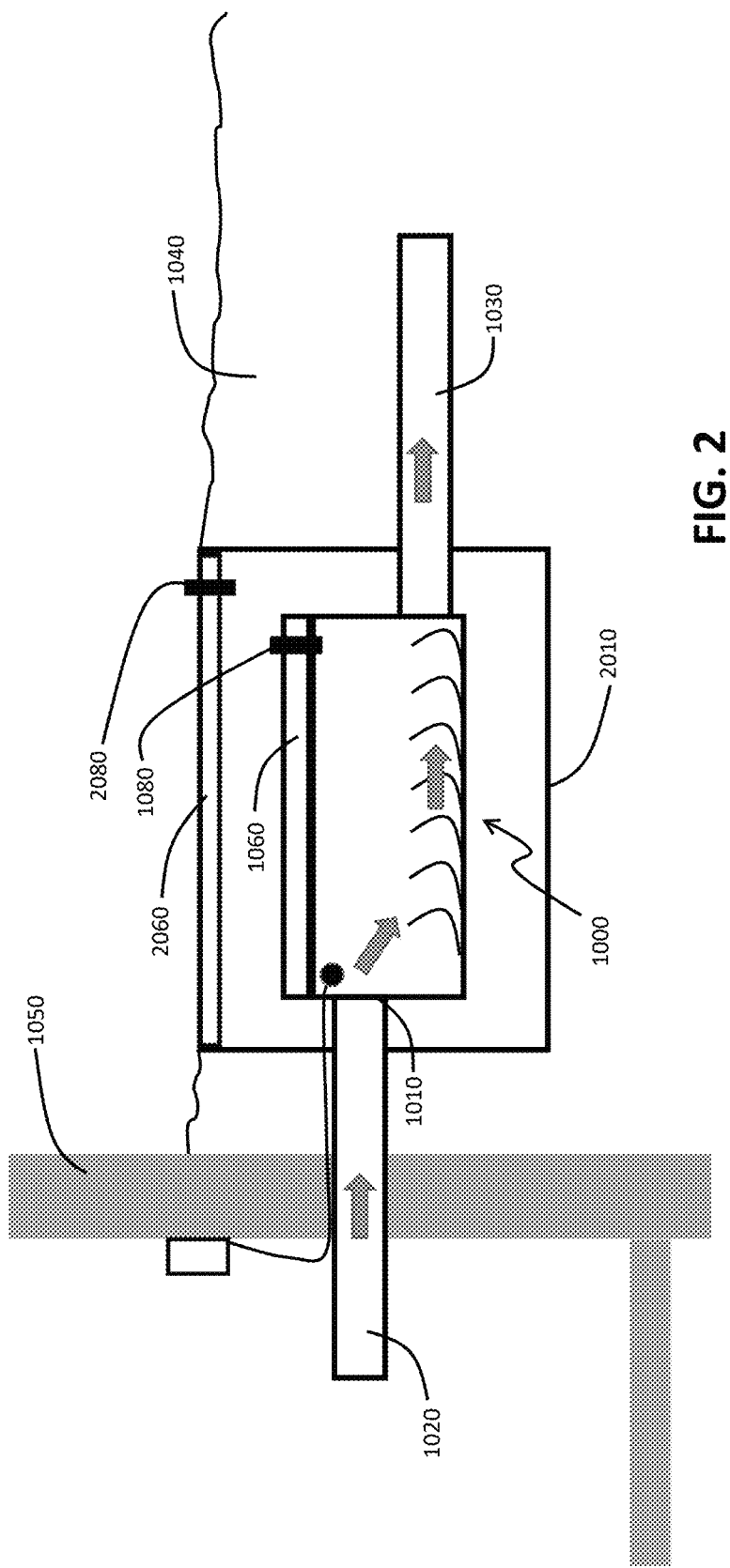
FIG. 2 is a cross sectional view of a trap assembly installed in accordance with another embodiment of the present disclosure.

Turning now to FIG. 2, in some embodiments the trap assembly 1000 may be installed on the exterior of a structure 1050. If installed on the exterior of the structure, the trap assembly 1000 may be below grade 1040. Further, the trap assembly 1000 may have a work box 2010 positioned around it to allow access without the need for digging. The work box 2010 ins installed into the ground thereby creating an open space of the trap assembly 1000. In addition to a regulated cover 1060 with a locking mechanism 1080 positioned on the trap assembly 1000, the work box 2010 may also include a cover 2060 with its own locking mechanism 2080. In this arrangement the access to the interior of the trap assembly 1000 may be controlled by a lock 2080 on the cover 2060 of the work box 2010, a lock 1080 on the cover 1060 of the trap assembly 10000, or a lock in both positions.

Figure 3:
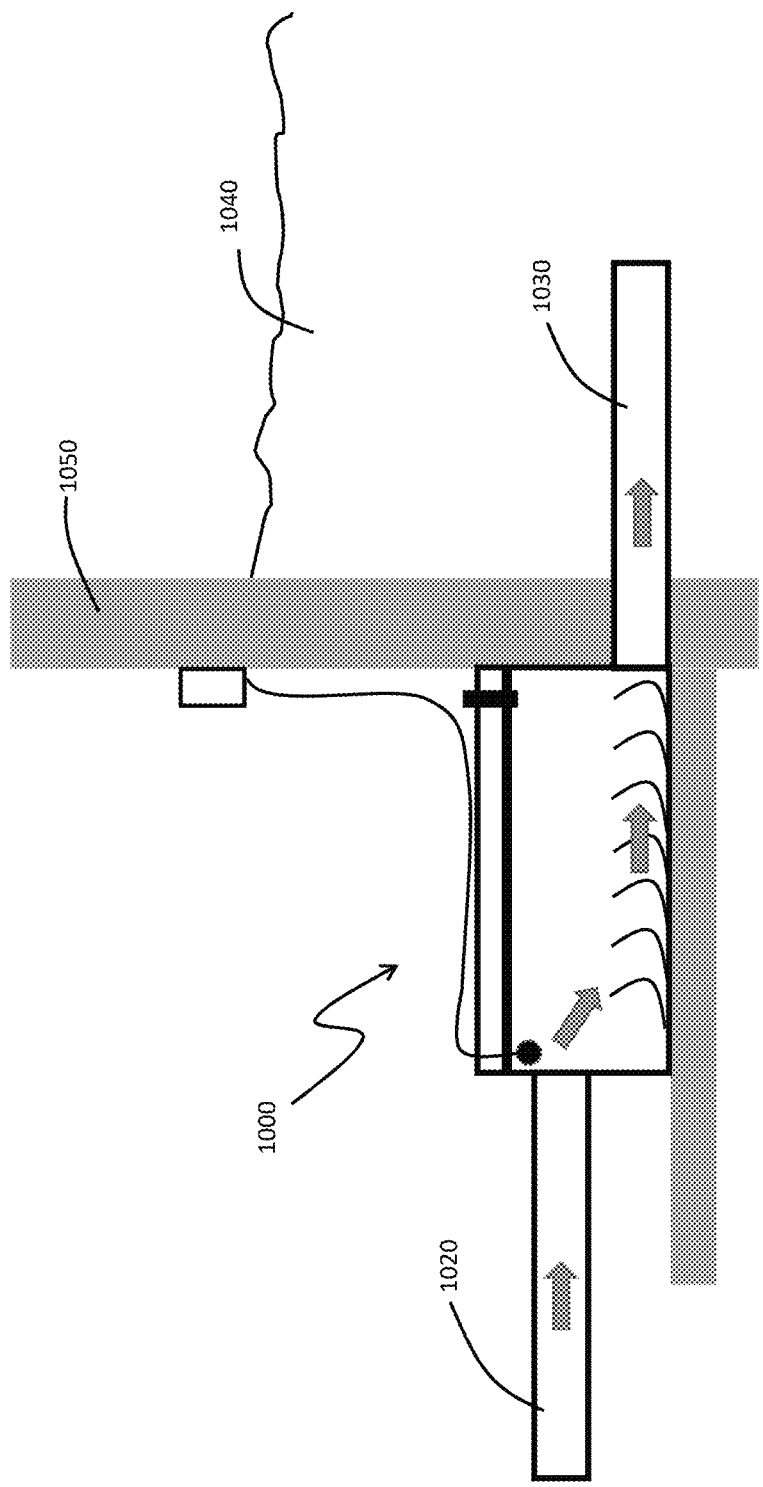
FIG. 3 is a cross sectional view of a trap assembly installed in accordance with yet another embodiment of the present disclosure.

Turning now to FIG. 3, in some embodiments the trap assembly 1000 may be installed on the interior of a structure 1050. If installed on the interior, the trap assembly 1000 is configured an arranged for installation at the outlet end of sewer pipe lateral 1020 at a location prior to its extending through the structure 1050 and connecting with the municipal sewer system 1030. Despite being positioned on the interior of the structure, the trap assembly 1000 may still include a secondary work box positioned around it to provide additional security to prevent unauthorized access or tampering.

Figure 4:
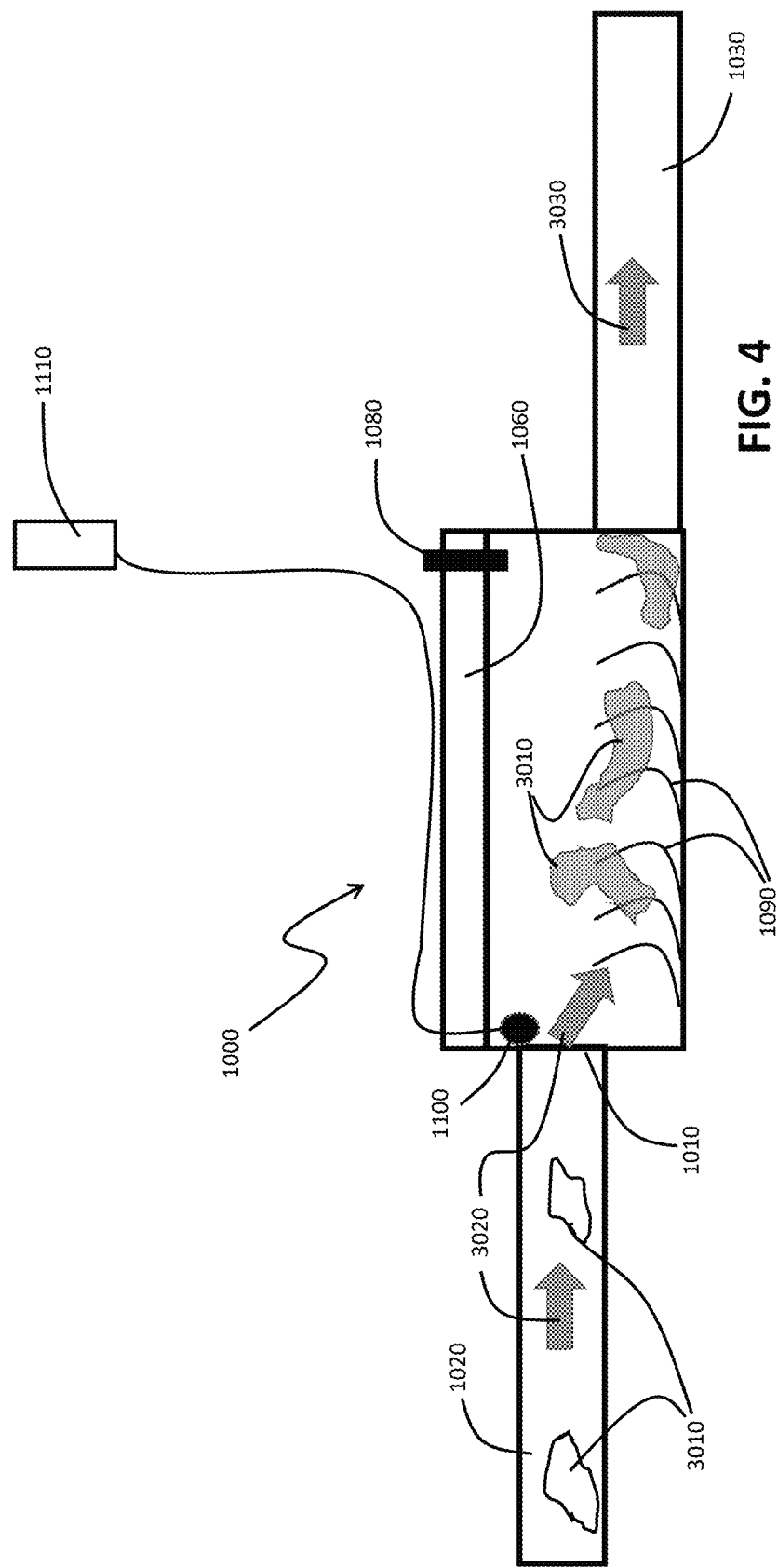
FIG. 4 is a cross sectional view of a trap assembly illustrating a method in accordance with the present disclosure.

Turning to FIG. 4, in accordance with a method disclosed herein, a controlled access trap assembly 1000 as described above is installed on an outlet 1010 of a sewer lateral 1020 prior to its discharge into the municipal sewer disposal system 1030. Prohibited materials 3010 such as wipes, diapers and the like, that are disposed of via the sewer lateral 1020, flow with the sewer discharge 3020 along the lateral 1020. When the prohibited materials 3010 reach the interior of the trap assembly 1000 that are captured by the capture mechanism 1090 contained therein, preventing the prohibited materials 3010 from being discharged in the flow 3030 to the municipal sewer system connection 1030. Should sufficient prohibited materials be captured in the trap assembly an alarm sounds to indicate an imminent clog within the sewer lateral. In order to clear the collected debris, the occupants of the building must contact the municipality managing the sewer disposal system in order to gain access to the trap assembly and clear the accumulated debris.

It can therefore be seen that the present disclosure provides a method and system that operates to capture improper disposal materials prior to their entry to the municipal sewer system. It can further be seen that the present disclosure provides a method and system that places the burdens of such improper disposals on the originator of the waste. It can still further be seen that the present disclosure provides a method and system that captures improper disposal materials at their source so as to provide notice to the generator of such waste that such activity is prohibited and to provide a mechanism by which responsibility for such improper waste disposal can be correctly identified and assigned. For these reasons, the present disclosure is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A trap assembly for capturing and preventing prohibited materials from entering a municipal sewer disposal system, comprising:
   a trap having a floor and an interior cavity with an inlet at a first end thereof and an outlet at a second opposing end thereof, wherein a lower flow path comprises a flow enters said interior cavity via said inlet, flows through said interior cavity and exits said interior cavity via said outlet;
   an operable lid on said trap allowing access to said interior cavity;
   a capture mechanism comprising an array of capture elements selected from the group consisting of: hooks, barbs, and combinations thereof, positioned within said interior cavity in the lower flow path adjacent and proximate to said outlet, said capture elements disposed on the floor and aligned in a direction opposing said lower flow path configured and arranged to capture prohibited materials contained in said discharge flow to retain said prohibited materials within said lower flow path to create an obstruction to said discharge flow,
   wherein said trap assembly, said inlet being connected to a sewer lateral exiting from said structure, said outlet being connected to a pipe discharging to a municipal sewer system,
   wherein said captured prohibited materials collect on said interior cavity within said lower flow path until said captured prohibited materials prevent further flow through said lower flow path.

2. The trap assembly of claim 1, wherein said prohibited materials are from the group consisting of: cloths, non-flushable wipes, diapers, lighters, ballpoint pens, wooden chopsticks, towels, mops, sanitary napkins, food waste, plastic bags, cleaning wipes, and combinations thereof.

3. The trap assembly of claim 1, wherein said trap assembly is installed on an interior of a structure, said inlet being connected to a sewer lateral within said structure, said outlet being connected to said pipe discharging to a municipal sewer system.

4. The trap assembly of claim 1, further comprising:
   a lock or anti-tamper loop preventing un authorized access to said operable lid and said interior cavity.

5. The trap assembly of claim 1, further comprising:
   an alarm system to determine a level of said flow within said interior cavity.

6. The trap assembly of claim 5, wherein said captured prohibited materials collect on said interior cavity until said captured prohibited materials prevent further flow through said interior cavity and trigger said alarm system.

7. The trap assembly of claim 1, further comprising:
   a work box installed in the ground adjacent said structure, the trap assembly being positioned within said work box, said work box having an operable lid.

8. The trap assembly of claim 7, further comprising:
   a lock or anti-tamper loop preventing un authorized access to said operable lid on said trap assembly and said interior cavity.

9. The trap assembly of claim 7, further comprising:
   a lock or anti-tamper loop preventing un authorized access to said operable lid on said work box and said trap assembly contained therein.

10. The trap assembly of claim 5, wherein said alarm system is selected from the group consisting of: visual, audible, or both.

11. The trap assembly of claim 5, wherein said alarm system provides notification locally within a structure being served by said trap assembly.

12. The trap assembly of claim 5, wherein said alarm system provides notification to an authority that maintains a municipality system that services said trap assembly.

\* \* \* \* \*